*FIGURE 1*

United States Patent Office 3,577,393
Patented May 4, 1971

3,577,393
ETHYLENE-PROPYLENE-DIENE TERPOLYMER RUBBERS AND PROCESSES THEREFOR
Albert Schrage, East Orange, and Jules Ernest Schoenberg, Bergenfield, N.J., assignors to Dart Industries Inc., Los Angeles, Calif.
Continuation-in-part of application Ser. No. 695,468, Jan. 3, 1968. This application Aug. 20, 1968, Ser. No. 753,995
Int. Cl. C08f 15/40
U.S. Cl. 260—80.78      7 Claims

ABSTRACT OF THE DISCLOSURE

Substantially gel-free novel sulphur-curable elastomers prepared by reacting ethylene, an alpha-olefin (preferably propylene) and the cross-dimer of cyclopentadiene and methylcyclopentadiene.

FIELD OF INVENTION

This invention relates to the field of elastomers and more particularly relates to novel elastomers prepared by reacting ethylene and an alpha-olefin such as propylene with a novel cyclic diene which is the product prepared by a cross-dimerization reaction between cyclopentadiene and an alkylcyclopentadiene monomer.

This application is a continuation-in-part of application Ser. No. 695,468, filed Jan. 3, 1968.

THE PRIOR ART

The various alpha mono-olefins mentioned above as useful for preparation of elastomeric compositions, that is, ethylene and propylene, are very important monomers because they are commercially available in great volume at very low cost. It is known that they can be copolymerized to give many kinds of products ranging in form from low molecular weight oils to high molecular weight plastics and elastomers.

Unfortunately, elastomers resulting from the copolymerization of ethylene and propylene are difficult to cure, that is, not convenient because they are saturated. Unlike natural rubber, styrene-butadiene rubber or butyl rubber, they contain no carbon-to-carbon double bonds to be used as sites for curing (that is, cross-linking) with sulfur and thus the curing procedures familiar to the rubber trade cannot be used. Alternative methods for curing, such as the use of high energy radiation or the employment of organic peroxides, are more expensive and may limit the choice of antioxidants which can be incorporated into the uncured copolymer.

In an effort to provide cure sites, various types of dienes have been studied for use in the complete modification of ethylene-propylene copolymers. Among the dienes studied in these prior attempts at providing cure sites for the elastomeric alpha-olefin copolymers are the cyclic non-conjugated dienes such as the dimers of cyclopentadiene or dimers of methylcyclopentadiene. Thus various patents have disclosed the use of dicyclopentadiene as the third monomer in elastomeric preparations such as U.S. Pat. 3,211,709, U.K. 1,014,874 and in the literature an article by G. Sartori et al. "Rubber Chemistry and Technology," volume 38 (3), pp. 620–626 (1965), while the dimers of methylcyclopentadiene ($C_{12}H_{16}$) are disclosed in French Pat. 1,447,845. The use, however, of cyclopentadiene dimer as a component in elastomeric compositions has resulted in compositions, at least according to the process of this invention, which contain large amounts of undesirable gel. The dimethyldicyclopentadienes such as disclosed in the French patent polymerize only to the extent of about thirty (30) percent of the charge and present inert material handling problems. It is therefore seen according to the foregoing that problems do exist with dienes of the type mentioned in the preparation of elastomeric compositions.

In addition to the observations hereinabove, some dienes are known to retard the rate of olefin polymerization while other dienes do not uniformly distribute throughout the terpolymer. Aliphatic dienes with two internal double bonds do not polymerize efficiently while dienes which contain two terminal double bonds or otherwise active double bonds can undergo cyclic polymerization forming ring compounds to give saturated polymers (which cannot be sulfur cured) or else undergo extensive cross-linking to give terpolymer containing large amounts of gel. Although they can be used, the conjugated dienes are less desirable, for the foregoing reasons, as modifiers to produce curable, ethylene-propylene rubbers. In fact, in some instances, they have been found to retard the polymerization.

In the art of synthetic elastomer manufacture and taking the above comments into consideration, it has been found that in order to make the ethylene-propylene-diene terpolymers sulphur-curable, it is important to employ a non-conjugated diene as a termonomer, especially one which results in products containing relatively little or no cross-linking. The non-conjugated diene chosen, in view of this, must contain one double bond which is reactive towards polymerization with the other monomers and one which is inactive or substantially non-reactive during the polymerization and which therefor appears as unsaturation in the ultimate terpolymer. If the second unsaturated linkage is reactive in the polymerization, then the terpolymer product will contain undesirably high levels of cross-linked product which is also known as insoluble gel. It has been found to be of utmost importance to produce the ethylene-propylene polymers with minimal levels of gel to have good processability and physical properties in the polymer products.

Those non-conjugated dienes which have been found useful in the prior art include dicyclopentadiene, methylenenorbornene, and ethylidenenorbornene. However, these known dienes either suffer from technical disadvantages or are economically unattractive. Another diene which has been used is the dimer of methylcyclopentadiene (see French patent supra); however, this material is actually a mixture of various isomeric $C_{12}H_{16}$ dimers and only about 30% of the mixture is polymerizable. Thus, this product is not practical for use as a monomer since it introduces undesirable inert material into the polymerization.

STATEMENT OF INVENTION

It is an object of this invention to produce rubbery polymers based on ethylene and alpha-olefin monomers with novel non-conjugated diene monomers as the third polymerizable monomer component.

It is another object to utilize novel cyclopentadiene-alkylcyclopentadiene cross-dimer adducts as monomers to produce improved terpolymers.

It is another object to employ cyclopentadiene-methylcyclopentadiene cross-dimer in rubbery terpolymers capable of cure with conventional accelerators using standard curing recipes and procedures.

It is a further object to prepare ethylene-propylene-diene terpolymers having low gel levels.

Other and further objects will become apparent from the more detailed description set forth hereinbelow.

There has thus been found, according to this invention, a novel, heretofore unknown non-conjugated diene which functions as the third monomer in ethylene-propylene polymerizations and which gives outstanding results as will be illustrated hereinbelow. This newly discovered diene, the cross-dimer of cyclopentadiene and methylcyclopentadiene polymerizes rapidly without retarding the rate of polymerization and enters readily into the ethylene-propylene polymerization. The resulting terpolymers have commercially acceptable low gel levels of 1% or less.

This invention therefore relates to novel ethylene alpha-olefindiene rubbery terpolymers, and to processes to produce same, and more particularly, relates to such rubbery terpolymers from ethylene, propylene and the cross-dimer of cyclopentadiene and methylcyclopentadiene and polymerizations thereof.

The diene material employed in accordance with this invention is best defined as a mixture of cross-dimers of methylcyclopentadiene and cyclopentadiene. The method of synthesis is defined in copending application Ser. No. 695,405, filed Jan. 3, 1968 and one method is to first crack a mixture of the two individual dimers to a mixture of their monomers which are then allowed to redimerize in a random manner. An alternate method is to crack the individual dimer to the monomers which are mixed and allowed to redimerize in a random manner as disclosed in said copending application. The redimerized mixture is then fractionated in a distillation column and the $C_{11}H_{14}$ cut, which comprises about 50% of the undistilled mixture, is used as diene for polymerization. Mixtures of the $C_{11}H_{14}$ and minor amounts of other dimers can be used so long as the benefits of employing the cross-dimer of this invention are realized. The C–10 and C–12 homodimer cuts can be recycled to the cracking reaction.

Characterization by nuclear magnetic resonance and mass spectrometry shows that the dimer formed by the Diels-Alder reaction is a mixture of the structures:

I(a)   I(b)

The invention encompasses the preparation of amorphous sulphur-vulcanizable rubbery terpolymers of ethylene, at least one alpha-olefin having the formula $CH_2=CHR$, wherein R is saturated alkyl radical having from 1 to 8 carbon atoms, and at least one cyclic diene which is a cross-dimer of cyclopentadiene and methylcyclopentadiene.

In using ethylene and propylene which is the preferred alpha-olefin and the dienic cross-dimer as monomers, it is necessary to adjust the ratio of the monomers reacted so as to obtain in the final terpolymer an ethylene content ranging between 20 and 70% by weight, and a propylene content ranging between 30 and 80% by weight. The amount of the dimer which is present in the terpolymer must exceed 1% and preferably exceed 3% by weight in order that a sufficient number of carbon-to-carbon double bonds are available for vulcanization. Thus the ultimate terpolymer contains from 70 to 97% by weight of ethylene and propylene in the above proportions and from 3 to 30 percent of cross-dimer.

In order to obtain satisfactory terpolymer for the preparation of elastomers, it is necessary that the diene units be uniformly spaced along the polymeric molecule to provide the best uniformity of vulcanization.

The proportion of cyclic diene used should be sufficient to afford the polymer an ethylenic unsaturation corresponding to an Iodine Number of from 5 to 50. It is best practice to introduce only enough of the diene so that the polymer can be cured satisfactorily, since the good aging properties associated with ethylene-propylene rubber are thereby maintained; an unnecessary excess of the cyclic diene may spoil the ageing properties. It is preferred that the incorporated diene content should be from 3 to 20% by weight of the composition. Examples of useful 1-olefins other than propylene are butene-1, hexene-1, 4-methylpentene-1, 5-methylhexene-1, and 4-ethylhexene-1. The preferred olefins are propylene and butene-1.

The catalysts and catalyst systems which can be used to give the ethylene-propylene-diene cross-dimer polymers are generally the same as those which are known for preparing ethylene-propylene polymers.

Coordination catalysts which can be used in the preparation of the terpolymers are those formed by mixing vanadium compounds such as vanadium tetrachloride, vanadium oxytrichloride (also called vanadyl chloride), and vanadium tris(acetylacetonate) with a reducing compound having the structure $(X)_3Al$ or $(X)_2AlY$ where the X groups are alkyl or aryl or cycloalkyl groups containing 1 to 12 carbon atoms, for example, ethyl, isobutyl, octyl, or dodecyl groups and Y is a chlorine or a bromine or a hydrogen atom. The relative proportions of the vanadium compound and the organoaluminum compound can be varied so that the value of the atomic ratio of aluminum to vanadium ranges between 1:1 to 20:1, preferably 5:1 to 10:1. Substances such as hydrogen can be used to regulate molecular weight.

The catalyst system vanadium tetrachloride-diethylaluminum chloride has been found especially advantageous but others have likewise been found useful.

The transition metal compound and the organoaluminum compound cocatalyst can be mixed in the presence, or absence of the monomer to be polymerized. The active catalyst can also be formed in situ in the polymerization reactor, or preformed separately, prior to the polymerization. This preparation of the catalyst can be carried out at a temperature which is higher or lower than ambient temperature, in general at a temperature ranging from $-30°$ C. to $+40°$ C., in the presence of polymerization solvents, in an inert gas atmosphere.

Solvents such as aromatic, aliphatic or cycloaliphatic hydrocarbons, or saturated or unsaturated chlorinated hydrocarbons, such as toluene, heptane, cyclohexane and tetrachlorethylene conveniently are employed. It is also possible to operate without solvents by employing an excess quantity of the least reactive olefin, as, for example, by carrying out the terpolymerization in liquid propylene.

The polymerization reaction is carried out at temperatures ranging between $-30°$ C. and $+60°$ C., preferably between $-20°$ C. and $+30°$ C. Since gel content of the ethylene-propylene-diene terpolymers tends to increase with temperature and catalyst productivity tend to decrease with temperature, it is of advantage to carry out the polymerizations at temperatures as low as possible.

The attached process flow diagram (FIG. 1) which forms a part of this invention illustrates at least one method for carrying out the polymerization reaction for the preparation of the novel elastomers herein.

The remainder of the attached figures show the following—

In FIG. 2 as well as in the remaining figures, commercial EPT–A, a fast curing rubber is believed to contain the termonomer ethylidene norbornene while commercial EPT–B contains as a termonomer, cyclopentadiene.

Figure 2:
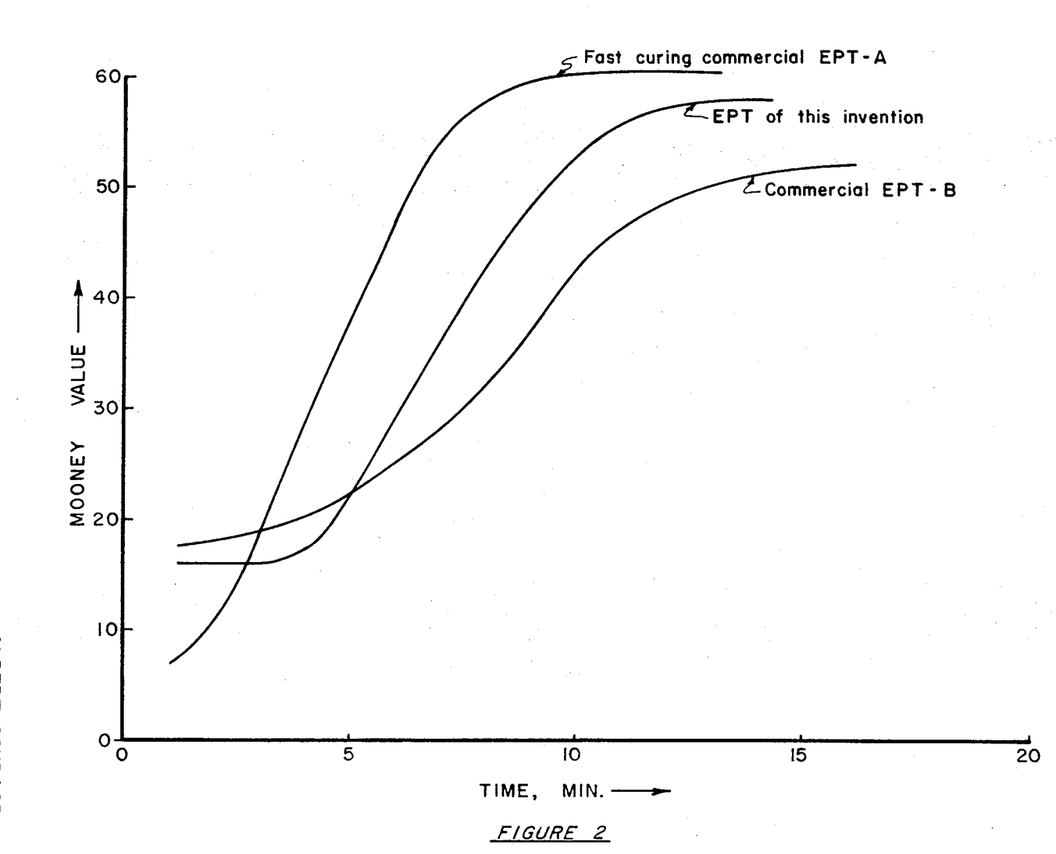
FIG. 2: A comparison of cure rates using carbon black filler of commercial EPT's and an EPT of this invention (EPT=Ethylene-Propylene Terpolymer).
Figure 3:
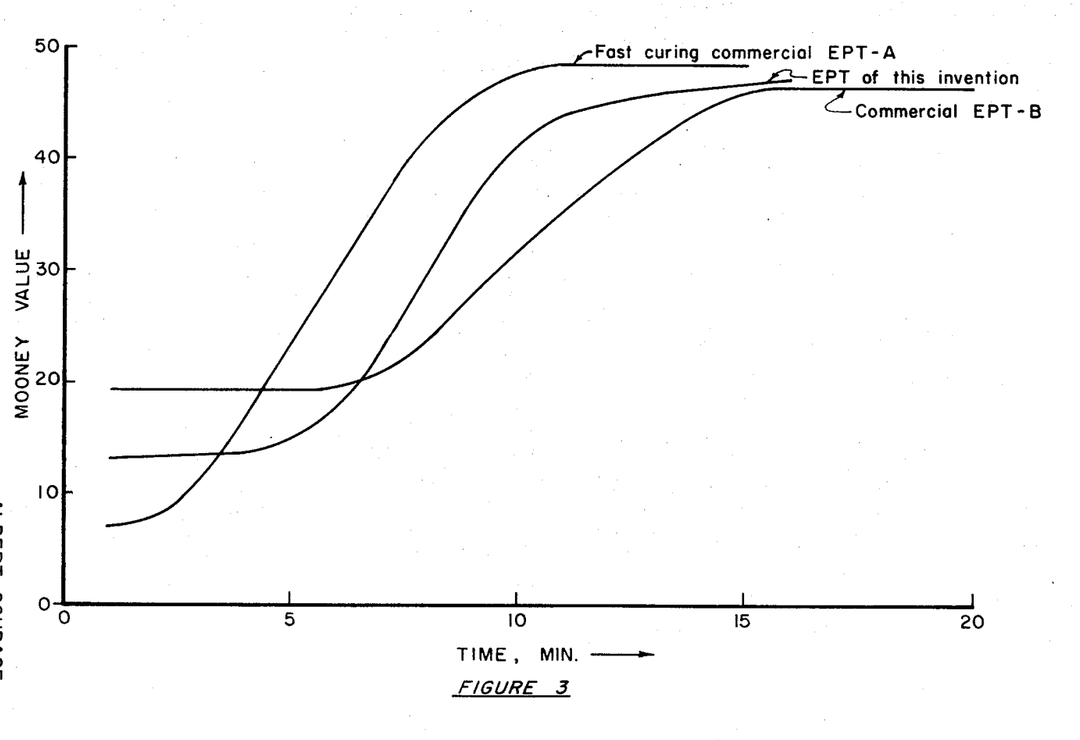
FIG. 3: Same as FIG. 2 except silica is used as filler (for white rubber, white side walls and household goods).

The following conclusions can be reached with regard to the information shown in FIGS. 2 through 6 on the cure rates of EPT's containing 5 weight percent of the diene, of this invention, ethylidene norbornene and dicyclopentadiene using standard vulcanizations recipes on lightly loaded compounds:

For FIGS. 2 and 3: The EPT of this invention reaches 80% (FIG. 3) or 95% (FIG. 2), depending on the recipe, of the cure attained by commercial EPT-A in the time that the latter reaches 95% of its maximum cure at 320° F. The following information applies to these figures:

As to FIG. 2:

Cure temp.—320° F.
Mooney large disc 3.75° rotation—5 seconds

RECIPE

| | |
|---|---|
| Rubber | 100 |
| FEF black | 20 |
| Stearic acid | 1.0 |
| ZnO | 5.0 |
| S | 1.5 |
| TMTDS | 1.5 |
| MBT | 0.5 |

As to FIG. 3:

Cure temp.—320° F.
Mooney large disc 3.0° rotation—5 seconds

RECIPE

| | |
|---|---|
| Rubber | 100 |
| Silica | 20 |
| Stearic acid | 1.0 |
| Carbowax 6000 | 0.6 |
| ZnO | 5.0 |
| S | 1.5 |
| TMTMS | 1.5 |
| MBT | 0.5 |

Figure 4:
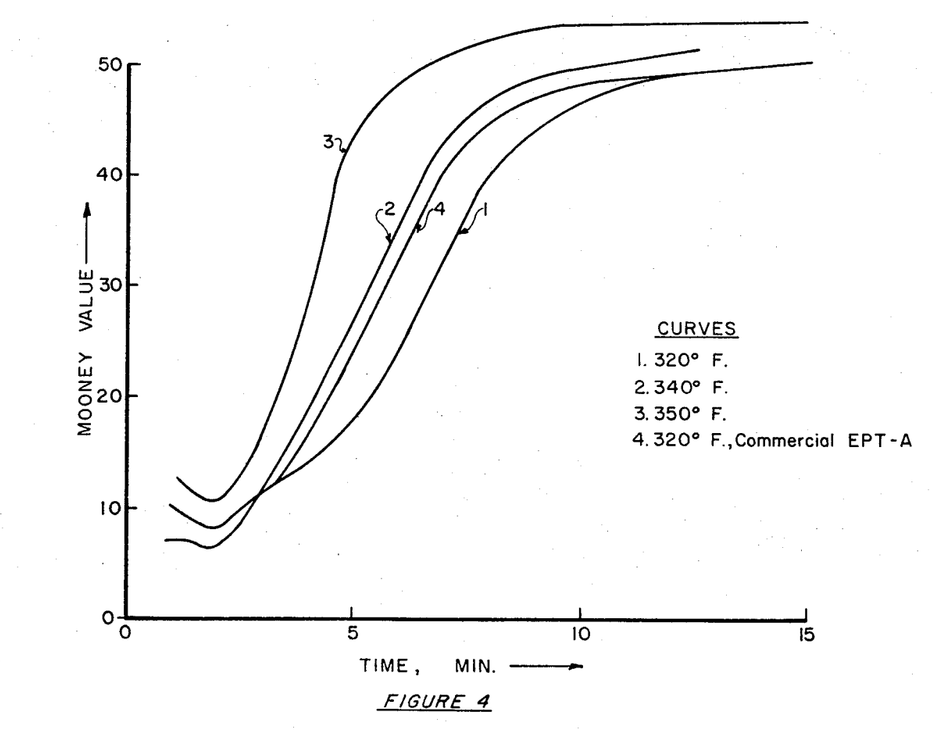
FIG. 4: Effect of cure temperature on cure rate (using TMTMS–MBT—Tetramethylthiuram monosulfide - Mercapto-benzothiazol) of EPT containing the termonomers shown in FIG. 2.
Figure 5:
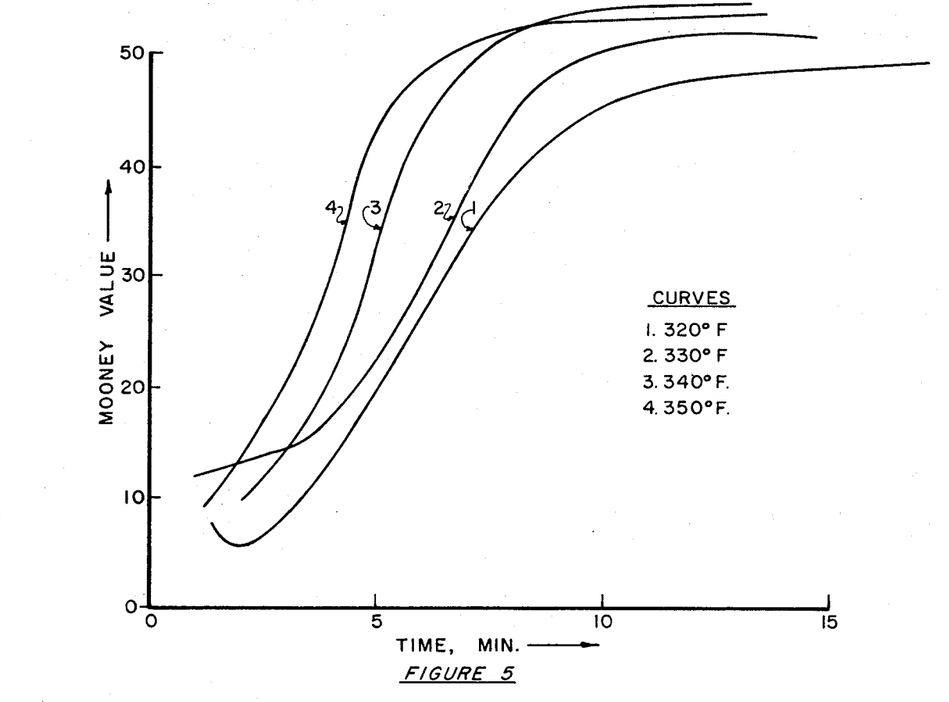
FIG. 5: Effect of cure temperature on cure rate (using TMTDS–MBT, compare FIG. 4).

For FIGS. 4 and 5 it is shown that raising the cure temperature increases the cure rate. At about 340° F. the cure rate of the EPT of this invention is about the same as that of fast curing commercial EPT-A at 320° F. The EPT literature indicates that the temperature range of 300–350° F. is in common use. The following information applies to FIG. 4:

Mooney large disc 3.0° rotation—5 seconds

RECIPE

| | |
|---|---|
| Rubber | 100 |
| FEF black | 20 |
| Stearic acid | 1.0 |
| ZnO | 5.0 |
| S | 1.5 |
| TMTMS | 1.5 |
| MBT | 0.5 |

CURVES (1) 320° F., this invention
(2) 340° F., this invention
(3) 350° F., this invention
(4) 320° F., commercial EPT-A The following information applies to FIG. 5:

Mooney large disc 3.0° rotation—5 seconds

RECIPE

| | |
|---|---|
| Rubber | 100 |
| FEF black | 20 |
| Stearic acid | 1.0 |
| ZnO | 5.0 |
| S | 1.5 |
| TMTDS | 1.5 |
| MBT | 0.5 |

CURVES (this invention)

(1) 320° F.
(2) 330° F.
(3) 340° F.
(4) 350° F.

With respect to FIG. 5 it is shown that the disulfide system gives faster cure rates than the monosulfide system compared to FIG. 4 (by 10 to 20% faster—temperature range 320–350° F.).

Figure 6:
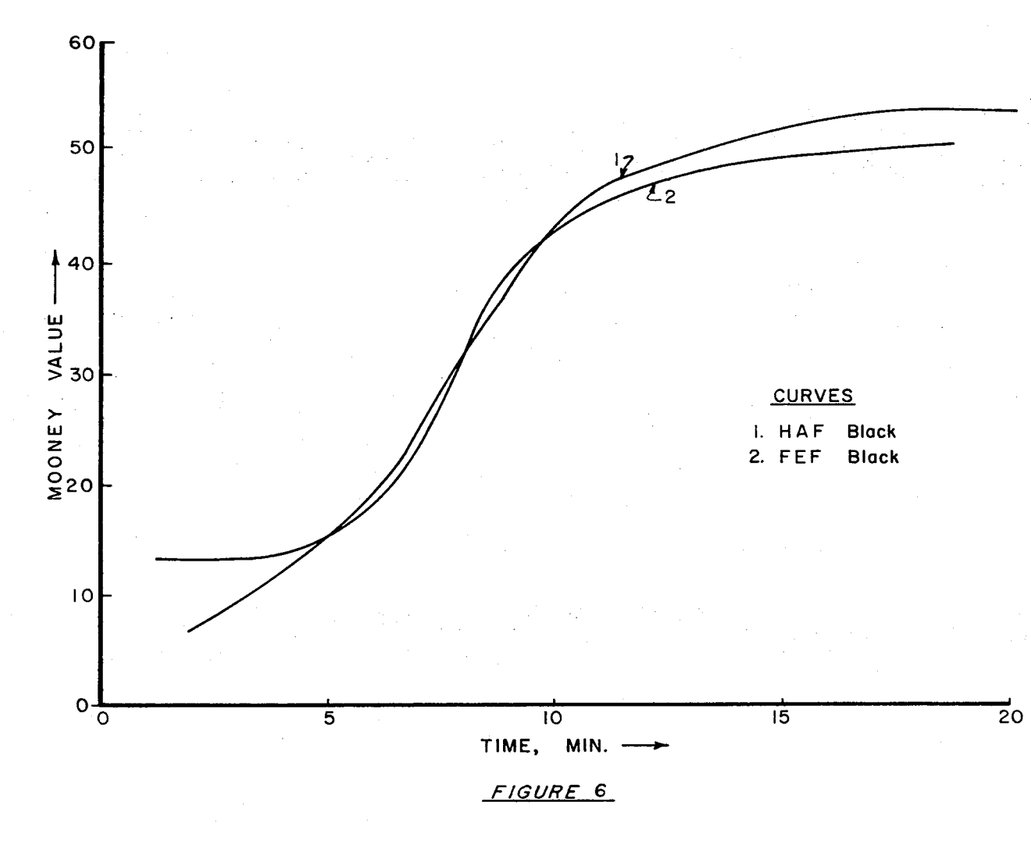
FIG. 6: Comparison of two carbon blacks (different particles size—commonly used).

Finally in FIG. 6 there is illustrated that there is no difference in cure rate between FEF black and HAF black. The former seems to mix in more readily with the rubber. The following information is pertinent:

Mooney large disc 3.0° rotation—5 seconds

RECIPE

| | Parts by weight |
|---|---|
| Rubber | 100 |
| Black | 20 |
| Stearic acid | 1.0 |
| ZnO | 5.0 |
| TMTMS | 1.5 |
| S | 1.5 |
| MBT | 0.5 |

CURVES (1) HAF Black
(2) FEF Black

Cure rate information was obtained by using the Mooney viscometer. It has been found possible to use the Mooney viscometer as an oscillating rheometer and thereby measure the cure rate as indicated by progressive changes in the torque required to effect periodic small torsion strains (modulus) in the sample disc. The sample is tested three degrees forward and back over a 10 second period every minute. The linear plot of maximum torque per cycle v. time gives a cure rate curve similar in shape to those obtained with varius rheometers. The Mooney viscometer is the standard model stipulated in the ASTM literature and the rubber samples are molded according to ASTM procedures.

The foregoing information relating to "cure rate" with the information in the specification adequately demonstrating substantially no gel formation by the use of the novel cross dimer in the elastomeric preparation illustrates the advantages that could not have been predicted when using the novel diene in comparison to the well known dicyclopentadiene of the prior art.

Figure 1:
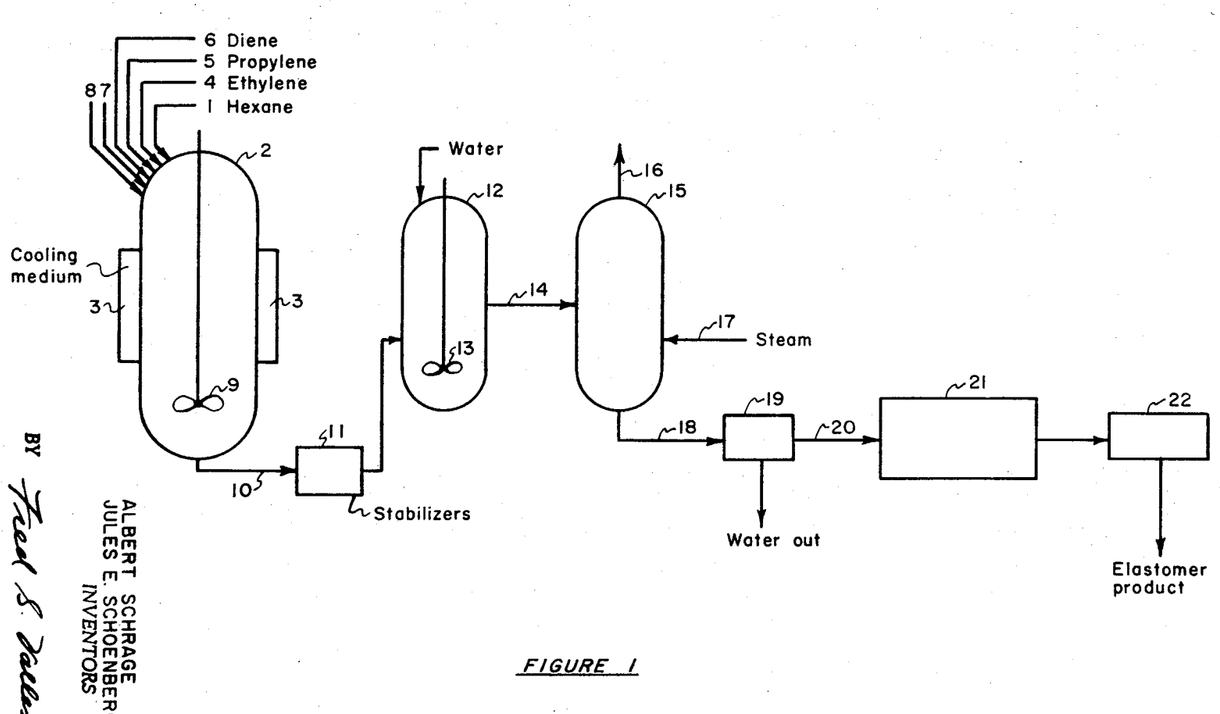

In FIG. 1 hexane as a solvent is introduced via line 1 to reactor 2 which is jacketed as illustrated at 3 in order to remove heat of reaction (since the reaction is an exothermic one). Lines 4, 5 and 6 are used to introduce the various monomeric compositions namely ethylene, a higher alpha-olefin such as propylene, and the diene of this invention into reactor 3. Lines 7 and 8 are used to introduce the two catalyst component systems such as vanadium tetrachloride and DEAC (diethylaluminum monochloride). Typically a reaction involves (see specific examples hereinbelow) the introduction of ethylene and propylene and the cross-dimer of cyclopentadiene and methylcyclopentadiene into the reactor containing hexane wherein the reaction is carried out to form the novel elastomer composition of this invention. The reactor can be operated at a temperature typically of from −30 to 60° C. and a pressure of 1 to 15 atm. The reaction mixture is well stirred by stirrer 9 as indicated. After the appropriate residence time the products are withdawn via line 10 and pumped through unit 11 which is an in-line mixing device where suitable stabilizers are incorporated and the product is then taken to vessel 12 where it is contacted with hot water to effect the removal of catalyst residues. The contact in this vessel is made also under agitation conditions as illustrated by the agitator 13 therein. After a residence time of approximately one hour at a pressure of 100 to 500 p.s.i. the mixture is taken via line 14 to flashing unit 15 where unreactive monomers and solvent are distilled off and removed through line 16. Steam is introduced to unit 15 by line 17 as indicated in the drawing. The flasher is operated at atmospheric pressure. The product from flasher unit 15 is taken through line 18 to dewatering unit 19 where most of the water is removed and then subsequently via line 20 to dryer 21 where the crumb rubber is substantially dried. Finally the product is taken to a baler 22 as indicated and recovered therefrom as the finished product of this invention.

The polymerization reaction is generally carried out in solution or suspension and the polymer is recovered by coagulation and drying. A catalyst removal step can also be used if required. The polymerization pressures employed can vary between 1 and 15 atmospheres.

The polymerization using the novel diene cross-dimer does not require, it has been found, any different conditions or unusual precautions and may follow the usual, known procedures for manufacture of the ethylene-propylene polymers. It is preferred, as with other monomer systems, to carry out the reaction as a continuous polymerization. The monomers are added either together or preferably as separate streams in a continuous or semi-continuous manner. The cross-dimer unexpectedly shows a remarkably constant polymerization reactivity over a wide variety of conditions thereby indicating that the resulting polymer product has a uniform distribution of diene that is extremely favorable to vulcanizates having good physical properties.

It is important to have the diene uniformly distributed throughout the finished polymer product. For this, it is important that the concentrations of ethylene, alpha-olefin and cross-dimer be maintained substantially unchanged during the course of polymerization. Reaction variables such as agitation, length of polymerization period, dilution, and speed and order of addition of polymerizable monomers which may affect the above concentrations must be carefully adjusted to effect constancy of reaction feed rates.

The use of the cross-dimer of cyclopentadiene and methylcyclopentadiene as the diene with ethylene and propylene to make terpolymers has been found to have unpredicted advantages over even closely related dienes when used for the same purpose. For example, polymerization reactions run at 20 to 25° C. using ethylene, propylene, with the cross-dimer as the diene, gives polymer having substantially no gel. On the other hand, when dicyclopentadiene is used as the diene in the polymerization reaction under the same conditions, the polymer has a high gel content.

When EPT containing the diene of this invention is vulcanized and the rate of vulcanization is compared with the rates of vulcanization of two commercial EPT rubbers, one of these being of the slow curing type, the other being of the fastest curing type on the market, it is observed that the EPT containing the diene of this invention cures as rapidly as the fastest curing commercial rubber and much more rapidly than the slow curing commercial rubber. It is to be noted from the figures attached that the slow curing type of commercial rubber reaches only about 60% of the full cure in the time that the other EPT's are essentially fully cured and that the cure rate then only rises very slowly over the course of several hours before it reaches full cure. Furthermore it is observed that the EPT containing the diene of this invention shows an induction period or a delay of several minutes before the rapid rate of cure begins. This induction period is not shown by the fastest curing commercial rubber. This induction period represents a very important practical advantage, known in the industry as a scorch safety factor, in the processing and compounding of the rubber since it allows several minutes for the incorporation of the various compounding ingredients such as carbon black, extender oil, accelerators, activators and sulfur on a hot roll mill or in a Banbury mixer after which the mixture is transferred to a molding machine. By virtue of this induction period all the additives may be safely compounded within the time of several minutes to give a homogenous blend which can then be vulcanized with safety in a molding machine in a controlled manner. This property is not shown by the fastest curing commercial EPT. It is believed that the diene contained in the fastest curing commercial EPT is ethylidine-norbornene and the slower curing commercial rubber contains dicyclopentadiene.

Experimental data collected from tests done on both the raw rubber and on vulcanizate samples have shown that the novel products of this invention have physical properties which are fully comparable and, in many instances superior, to the properties of the commercial ethylene-propylene rubbers. Thus, the inclusion of the cross-dimer produces products the equivalent of or having enhanced physical properties compared to commercially available ethylene-propylene terpolymer rubbers, at the same time avoiding the disadvantages of gel content which are found to accompany the use of other diene monomers.

The degree of unsaturation was determined chemically, by addition of iodine monochloride according to T. S. Lee, I. M. Kolthoff, M. A. Mairs, J. Polymer Sci., 3, 66 (1948); T. S. Lee et al., Anal. Chem. 22, 995 (1950).

The molecular weights of the polymers were determined by measuring the inherent viscosities. The values of the inherent viscosity were a function of the mode of polymerization under the above indicated conditions and can vary from 1 to 8, and more often from 1.5 to 5.

The curing tests were performed on the raw polymers using conventional formulations for unsaturated rubbers.

The novel terpolymers prepared by the process of this invention are rubbery in nature. They can be cured to highly useful elastomers. A wide variety of procedures may be employed for curing. For example, the terpolymers may be readily cured with sulphur. Any of the procedures familiar to those skilled in the processing of other rubbers such as natural rubber, butadiene-styrene rubber (SBR), and butyl rubber are suitable.

Various procedures and modifications of sulphur curing are described in Encyclopedia of Chemical Technology, Kirk and Othmer, published by Interscience Encyclopedia, Inc., New York, 1953, vol. 11, pages 892–927; Principles of High-Polymer Theory and Practice, Schmidt and Marlies, published by McGraw-Hill Book Co., Inc., New York, 1948, pages 556–566; and Chemistry and Technology of Rubber, Davis and Blake, published by Reinhold Publishing Corporation, New York, 1937, chapter VI. Typical procedures are illustrated in the example presented below.

Instead of sulphur curing, which is preferred, a peroxide cure can also be employed.

Many compounding agents can be incorporated with these polymers in order to improve the various properties of the cured rubber. For example, they may be loaded with carbon black in order to increase the tensile strength or extended with oil as in known in this art. Other compounding agents include titanium dioxide and silica.

The novel terpolymers of this invention have many uses. They can be employed in the manufacture of tires, inner tubes, belts, hose and tubing, footwear, sponges, coatings and a wide variety of coated or molded articles. They have a good thermal stability and excellent resistance to ozone. The following examples illustrate the present invention. All parts are by weight unless otherwise indicated.

EXAMPLE 1

Cyclopentadiene and methylcyclopentadiene were prepared by cracking the respective dimers. With cyclopentadiene, the procedure was to add 250 ml. of dicyclopentadiene to a 500 ml. flask, flush out the reaction system with nitrogen, adjust the nitrogen flow to one bubble per second, and then heat the dicyclopentadiene to 163–165° C. The cyclopentadiene monomer, distilled at 40° C., and was collected and stored at −76° C.

The procedure for the preparation of methylcyclopentadiene was to add 375 ml. of methylcyclopentadiene dimer to a 500 ml. flask, flush the system with nitrogen, adjust the nitrogen flow to one bubble per second, and then heat the dimer to 175–180° C. The methylcyclopentadiene distilled at 71° C., and was collected at −76° C.

The cross-dimer of cyclopentadiene and methylcyclopentadiene was prepared by mixing 222 g. of cyclopentadiene (3.4 moles) with 268 g. of methylcyclopentadiene (3.4 moles), flushing the mixture with argon and storing at room temperature for 88 hours in a stoppered bottle. The material was then analyzed in a 12′ x 0.25″ gas chromatographic column packed with silicone gum rubber SE 30 on Chromosorb W. The injection port was at 95° C. and the column at 75° C. The chromatogram had a single cyclopentadiene peak at a retention time of 7.4 minutes, three peaks due to $C_{11}H_{14}$ isomers at 8.2, 10.5 and 11.3 minutes and two peaks, due to methylcyclopentadiene dimer isomers, at 13.6 and 15.8 minutes. The $C_{11}H_{14}$ dimers comprised about 60% of the mixture.

The mixture was distilled through a 2.5 x 90 cm. Todd Distillation Column packed with 40 mm. glass helices. The first fraction to distill over consisted of the cyclopentadiene dimer and this had a boiling point of 55° C. at 9 mm. Hg. The $C_{11}H_{14}$ isomers of the cyclopentadiene-methylcyclopentadiene dimer boiled between 66 and 68° C. at a pressure of 9 mm. Hg. Analytical data collected from tests carried out on the product indicated it to be substantially pure cross-dimer.

EXAMPLE 2

A 1.5 liter stainless steel autoclave was flushed with ethylene and pressurized with ethylene to 23 p.s.i.g. To this reactor was added 500 ml. of hexane, 125 ml. of propylene, 0.55 ml. of $C_{11}H_{14}$ cross-dimer made for example as described above in Example 1, and 0.25 ml. of diethyl aluminum chloride. Stirring was begun and a 0.026 M solution of vanadium tetrachloride in hexane was added for 16 minutes. During this time monomer concentrations were held constant by feeding an 18 volume percent solution of $C_{11}H_{14}$ in hexane and a 50–50 mole percent gaseous mixture of ethylene and propylene. The temperature varied between 21.5 and 23.5° C. and the pressure between 46.5 and 52.0 p.s.i.g. The reaction was stopped with the addition of 10 ml. of a 10 weight percent solution of "Ionol" in isopropyl alcohol, the propylene was slowly vented and the rubber coagulated by pouring the clear solution into a Waring Blendor containing one liter of an "Ionol" (0.2%)—isopropyl alcohol mixture. ("Ionol" is a trademark identifying the chemical 2,6-ditertiarybutyl-4-methylphenol). The rubber was washed with fresh isopropanol containing 0.2% "Ionol" and vacuum dried at 35° C.

The summary of the reaction conditions and results is given below:

Millimoles $VCl_4$—0.17
Ml. $C_{11}H_{14}$ (added during run)—1.1
Yield (g.)—22.4
Inherent viscosity—2.76 (0.08 wt. percent solution in Decalin at 135° C.)
Iodine Number—12.2
Percent gel [1]—1.3 (hexane at room temp.)

[1] Gel is determined by dissolving 0.1 to 0.4 gram of rubber in 40 ml. of hexane, separating the insoluble gel by centrifugation at 15,000 r.p.m. (27,000 g.) and weighing the dry gel.

EXAMPLE 3

One hundred grams of ethylene-propylene-$C_{11}H_{14}$ terpolymer from five runs similar to that described in Example 2 above were cured at 320° F. for 30 minutes using the following proportions.

| Ingredients: | Parts |
| --- | --- |
| Rubber | 100 |
| FEF Black (fast extruding oil furnace black) | 50 |
| Zinc oxide | 5 |
| Stearic acid | 1 |
| "Captax" (2-mercaptobenzo-thiazole) | 0.5 |
| "Monex" (tetramethylthiuram monosulfide) | 1.5 |
| Sulfur | 1.5 |

The following properties were found upon carrying out standard tests on the resulting cured rubber product:

100% modulus—420 p.s.i.
300% modulus—1500 p.s.i.
Tensile strength—2470 p.s.i.
Elongation—530%
Shore A2 hardness—73

EXAMPLE 4

A 1.5 liter stainless steel autoclave was flushed with ethylene and pressurized with ethylene to 40 p.s.i.g. To the reactor was added 1.0 ml. of diethylaluminum chloride in 0.5 ml. of pentane, 500 ml. of butane and 275 ml. of propylene. Stirring was begun and a 0.051 molar solution of $VCl_4$ in n-butane was added for 30 minutes. During this 30 minute period 15.5 ml. of a 17 volume percent solution of dicyclopentadiene in n-butane and a 50:50 mole percent gaseous mixture of ethylene and propylene was added maintaining a constant reactor pressure (82–90 p.s.i. at 22–26° C.). The reaction was held for an additional 10 minutes and the solvent displaced with 700 ml. of isopropyl alcohol containing 0.2 g./l. "Ionol." The rubber was washed with fresh isopropyl alcohol containing 0.2 g./l. of "Ionol" and vacuum dried at 35° C. The results are given below. (Unless otherwise noted all gel determinations were performed in accordance with the procedure of Example 2.)

| | |
| --- | --- |
| Millimoles $VCl_4$ added | 0.33 |
| Ml. dicyclopentadiene added | 2.6 |
| Yield (g.) | 42.6 |
| Inherent viscosity | 2.13 |
| Percent gel | 27.1 |

The above example demonstrates that using dicyclopentadiene under substantially similar reaction conditions as in Example 2 that the elastomer produced has a large percentage of gel.

EXAMPLE 5

Commercial methylcyclopentadiene dimer was fractionally distilled at a 9:1 reflux ratio under reduced pressure. After a forerun of cyclopentadiene dimer, three successively higher boiling fractions were collected. The first distilled at 69–72° C. at 12–13 mm. Hg; the second at 53–57° C. at 6 mm. Hg; and the third at 56–58° C. at 6 mm. Hg. From each fraction a heart cut rich in one component, as indicated by gas chromatography, was taken and used for an ethylene propylene diene polymerization. The polymerization reaction was carried out in each case as set forth below. The material from the first fraction gave an elastomeric product having appreciable unsaturation as shown by its high Iodine Number of 13.8 which corresponds to a diene content of about 9% by weight. The elastomer made with diene from the second fraction had an Iodine Number of 3.5 and the elastomer made with diene from the third fraction had an Iodine Number of 2.3. Ethylene-propylene copolymer containing no diene ordinarily gives a control Iodine Number of about 2 indicating that in the last two materials there was at most only about 1% by weight diene incorporated in the polymer. A similar polymerization with the cross-dimer of this invention gives an Iodine Number of 19.

The first fraction amounted to 30% of the total distilled dimer mixture and contained about 60% of polymerizable diene as indicated by gas chromatography. The other two fractions, which constituted the remaining 70% of the mixture were essentially inert to polymerization conditions.

The procedure for the polymerization above were as follows: A 1.5 liter stainless steel autoclave was flushed with ethylene and pressurized with ethylene to 40 p.s.i.g. To the reactor was added 0.25 ml. of diethylaluminum monochloride, 500 ml. of butane, 215 ml. of propylene, and 3.6 ml. of diene. The polymerization reaction was started with the addition of a 0.029 molar solution of VCl$_4$ in hexane. The pressures were kept constant (70 to 82 p.s.i.g. at 19.5 to 22.5° C.) by feeding a 50:50 mole percent mixture of ethylene and propylene. After 3 to 4 minutes the reaction was terminated by the addition of isopropyl alcohol containing 0.2 g./l. of "Ionol." The products were recovered and purified in the same manner as in Example 4.

EXAMPLE 6

A series of runs were made as set forth in Table I below employing the novel cross-dimer of this invention. These runs were carried out in a 1.5 liter pressure autoclave. The runs were initiated by adding the ethylene, propylene and vanadium compound simultaneously. The addition was made to a stirred mixture of 70 volume percent of n-butane, 30 volume percent propylene and the particular cocatalyst indicated in Table I at temperature shown. In the table (and elsewhere) the term DEAC signifies diethylaluminum monochloride, DIBAC signifies diisobutylaluminum monochloride while Sesqui means ethylaluminum sesquichloride. The products were purified and recovered as in Example 5 above.

TABLE I

| Run Number | Catalyst | Aluminum compound | Temp., °C. | Percent gel | Iodine number | Intrinsic viscosity |
|---|---|---|---|---|---|---|
| 1 | VCl$_4$ | DEAC | 22 | 1.2 | 12.5 | 2.65 |
| 2 | VCl$_4$ | DEAC | 22 | 0.8 | 20.4 | 2.38 |
| 3 | VCl$_4$ | DIBAC | 22 | 0.3 | 24.7 | 3.06 |
| 4 | VCl$_4$ | DEAC | 22 | 1.1 | 22.9 | 2.17 |
| 5 | VCl$_4$ | DEAC | 22 | 2.5 | 20.8 | 2.20 |
| 6 | VCl$_4$ | Sesqui | 22 | 0.3 | 23.1 | 3.07 |

Table I above shows the consistent low gel level obtained in accordance with this invention even though the cocatalyst was varied (aluminum cocatalyst).

EXAMPLE 7

The following runs in Table II show further variations in the reaction media. In Run Number 1 the catalyst is vanadium tris(acetylacetonate) abbreviated V(acac).

EXAMPLE 8

The polymerization reactivity of the cross-dimer was determined by carrying out polymerizations which were terminated after 2 to 5 minutes. The polymerization was carried out in a 1.5 liter pressure autoclave. The autoclave was initially charged with the cross-dimer herein, ethylene, propylene, solvent and diethylaluminum monochloride. The catalyst VCl$_4$ was then added to the stirred mixture and the reaction was terminated (by the addition of isopropanol to the polymerization). The results of these runs are shown in Table III below.

TABLE III

| Run Number | Reaction solvent composition | Percent gel | Iodine number [1] | Diene mole fraction in monomer | Diene mole fraction in polymer | Mole fraction ratio |
|---|---|---|---|---|---|---|
| 656-50 | Cyclohexane, 25%; Propylene, 75% | 1.1 | 6.8 (7.3) | 0.0019 | 0.010 | 5.3 |
| 673-3 | Cyclohexane, 25%; Propylene, 75% | 0.8 | 12.1 (13.0) | 0.0040 | 0.018 | 4.5 |
| 693-8 | Benzene, 20%; Propylene, 80% | 0.7 | 10.6 (11.8) | 0.0044 | 0.017 | 3.9 |
| 693-11 | Hexane, 27%; Propylene, 73% | 0.7 | 13.6 (14.3) | 0.0045 | 0.020 | 4.5 |
| 724-1 | Butane, 70%; Propylene, 30% | 1.5 | 18.5 (20.5) | 0.0073 | 0.029 | 4.0 |
| 724-2 | Hexane, 27%; Propylene, 73% | 2.3 | 26.9 (28.3) | 0.0088 | 0.040 | 4.6 |
| 724-3 | Benzene, 20%; Propylene, 80% | 1.2 | 23.3 (24.7) | 0.0085 | 0.035 | 4.1 |
| 724-4 | Cyclohexane, 25%; Propylene, 75% | 1.4 | 25.4 (27.4) | 0.0086 | 0.038 | 4.4 |
| 656-20 [2] | Butane, 70%; Propylene, 30% | 32.1 | 5.8 (6.1) | 0.0019 | 0.0085 | 4.5 |

[1] Numbers in parentheses are calculated back to the start of the reaction (zero percent conversion).
[2] Dicyclopentadiene used in this run.

In the above runs the polymer compositions are about 59 mole percent of ethylene, 38 mole percent propylene, and the diene contents vary from about 1 to 3 mole percent. The monomer mole fractions are about 0.91–0.95 for propylene and 0.063–0.069 for ethylene.

From the above it should be noted that even at the high unsaturation levels the gel content is still at a satisfactory low level. This is in contrast to the case with the well known monomer dicyclopentadiene as illustrated above.

The high degree of constancy for the figures in the last column proves that the diene reactivity remains constant over a wide range of concentration and in various solvents.

The constancy and reliability of the diene reactivity enables one to closely control the degree of unsaturation of the elastomer by accurately charging previously calculated amounts of diene to the polymerization. This be-

TABLE II

| Run Number | Reaction solvent composition | Catalyst | Cocatalyst | Temp., °C. | Percent gel | Iodine number | Intrinsic viscosity |
|---|---|---|---|---|---|---|---|
| 1 | Hexane, 27%; Propylene, 73% | V(acac) | DEAC | 22 | 0.6 | 13.3 | 1.94 |
| 2 | Benzene, 20%; Propylene, 80% | VCl$_4$ | DEAC | 22 | 0.7 | 17.5 | 2.13 |
| 3 | Hexane, 27%; Propylene, 73% | VCl$_4$ | DEAC | 22 |  | 17.1 | 3.80 |
| 4 | Cyclohexane, 25%; Propylene, 75% | VCl$_4$ | DEAC | 22 | 2.1 | 16.5 | 3.06 |

NOTE.—In the above series of runs which were carried out in a 1.5 liter pressure autoclave as in Example 6 above the VCl$_4$ catalyst was added to a stirred mixture of the solvent indicated and diethylaluminum monochloride over a 30 minute period. (The monomer concentrations were held constant, in order to produce a homogenous product, with the addition of thylene, propylene and diene.) The hydrocarbons were then displaced by isopropanol as in Example 6 above.

havior of the diene enables one to tailor make elastomers for a variety of end use applications.

In Table IV below there is illustrated gel values obtained for a series of commercially available ethylene-propylene-diene terpolymers A through G. The gel was determined in accordance with the method indicated hereinbefore.

TABLE IV.—GEL VALUES OF COMMERCIAL RUBBERS

| Rubber: | Iodine No. | Gel (percent) |
|---|---|---|
| A | 10.1 | 24.4 |
| B | 18.6 | 16.9 |
| C | 11.3 | 11.0 |
| D | 9.2 | 15.3 |
| E |  | 1.1 |
| F | 8.5 | 0.8 |
| G | 8.0 | 3.0 |

From the above it will be seen that the preponderance of the commercial rubbers tested had high gel levels. The composition of the rubbers A through G is believed to be ethylene-propylene and cyclic diene for most of the products and aliphatic diene for the remaining products.

Although in this specification reference has heretofore been made to only the preferred cross-dimer of cyclopentadiene and methylcyclopentadiene, the invention in its broader concept embodies cross-dimers of cyclopentadiene, with alkylcyclopentadiene such as ethylcyclopentadiene and dimethylcyclopentadiene. The dimethyl compounds can be prepared readily by dehydrogenation of dimethylcyclopentanes and dimethylcyclopentenes which are found in petroleum products, or by the reaction between methyl iodide and the sodium salt of methylcyclopentadiene.

Although the process of this invention has been specifically described with reference to preferred embodiments herein, modifications can be made falling within the spirit of this invention and the scope of the appended claims.

What is claimed is:
1. An elastomeric interpolymer of at least two alpha-olefins, each of which contains from 2 to 10 carbons, and a cross-dimer component defined as said cross-dimer component being present in an amount sufficient to impart sulfur vulcanizability, and said interpolymer having an inherent viscosity of about 1 to about 8.

2. An interpolymer according to claim 1 wherein the two alpha-olefins are ethylene and propylene.

3. An elastomeric interpolymer of
(A) about 70% to 97% by weight of
(1) about 20% to 70% by weight of units of ethylene and
(2) about 30% to 80% by weight of units of at least one alpha-olefin having the structure R—CH=CH$_2$ wherein R is an alkyl radical having 1 to 8 carbon atoms, and
(B) about 3% to 30% by weight of units of a cross-dimer component defined as said interpolymer having an inherent viscosity of about 1 to about 8.

4. An interpolymer according to claim 3 wherein said alpha-olefin is propylene or 1-butene.

5. The vulcanizate of the elastomeric interpolymer of claim 3.

6. An elastomeric interpolymer of
(A) about 70% to 97% by weight of
(1) about 20% to 70% by weight of units of ethylene and
(2) about 30% to 80% by weight of units of propylene, and
(B) about 3% to 30% by weight of units of a cross dimer component defined as said interpolymer having an inherent viscosity of about 1.5 to about 5.

7. The vulcanizate of the elastomeric interpolyer of claim 6.

References Cited
UNITED STATES PATENTS

| 3,211,709 | 10/1965 | Adamek | 260—79.5 |
| 3,238,251 | 3/1966 | Williams | 260—666 |
| 3,356,751 | 12/1967 | Schneider | 260—666 |

OTHER REFERENCES

Glaser, Marvin B.: Dedimerization of Methyldicyclopentadiene, Industrial and Engineering Chemistry, vol. 51, May 1959, pp. 703–6.

JOSEPH L. SCHOFER, Primary Examiner
R. S. BENJAMIN, Assistant Examiner

U.S. Cl. X.R.
260—79.5, 666

Notice of Adverse Decision in Interference

In Interference No. 98,251 involving Patent No. 3,577,393, A. Schrage and J. E. Schoenberg, ETHYLENE-PROPYLENE-DIENE TERPOLYMER RUBBERS AND PROCESSES THEREFOR, final judgment adverse to the patentees was rendered Mar. 13, 1974, as to claims 1 and 2.

[*Official Gazette July 2, 1974.*]